(12) United States Patent
Zortea et al.

(10) Patent No.: US 6,829,314 B1
(45) Date of Patent: Dec. 7, 2004

(54) ADAPTER FOR NEAR END CROSSTALK AND ECHO CANCELLER FOR BI-DIRECTIONAL DIGITAL COMMUNICATIONS

(75) Inventors: Anthony Eugene Zortea, Pipersville, PA (US); Todd K. Moyer, Aurora, OR (US)

(73) Assignee: 3Com Corporation, Santa Clara, CA (US)

(*) Notice: Subject to any disclaimer, the term of this patent is extended or adjusted under 35 U.S.C. 154(b) by 840 days.

(21) Appl. No.: 09/636,047

(22) Filed: Aug. 10, 2000

(51) Int. Cl.[7] .............................. H03D 1/04; H03D 1/06; H03K 6/04; H03K 5/01; H04B 1/10; H04C 1/00; H04C 25/08

(52) U.S. Cl. ...................... 375/346; 375/230; 375/231; 375/232; 375/233; 375/234

(58) Field of Search .................. 375/232, 346, 375/349, 350; 455/562.1; 379/406.08

(56) References Cited

U.S. PATENT DOCUMENTS 4,233,683 A * 11/1980 McRae ...................... 375/232

* cited by examiner

Primary Examiner—Stephen Chin
Assistant Examiner—Curtis Odom
(74) Attorney, Agent, or Firm—Michaelson & Associates; Peter L. Michaelson

(57) ABSTRACT

The invention is embodied in an adapter for use with a near end crosstalk (NEXT) canceller which reduces crosstalk, from a locally transmitted signal, in a locally received digital signal by superimposing, on the received signal, a correction signal comprising a sum of m largest time-delayed weighted and bandpass filtered samples of the transmitted signal spanning a range of n time delayed values, where m<n.

24 Claims, 3 Drawing Sheets

ADAPTER FOR NEAR END CROSSTALK AND ECHO CANCELLER FOR BI-DIRECTIONAL DIGITAL COMMUNICATIONS

BACKGROUND OF THE INVENTION

1. Technical Field

The invention is related to digital communication devices that both transmit and receive, such as a computer modulator-demodulator (modem) or a network interface circuit for a personal computer, and more specifically to the reduction of near-end cross-talk and echo in such devices.

2. Background Art

A digital communication device useful, for example, in linking a personal computer to a local area network typically must be able to transmit data as well as receive data. In a local area network, the communication device is part of a network interface card of the personal computer, the network being formed by multi-conductor cables connected between the network interface cards of the different personal computers in the network. Typically, a network interface card transmits communications on one set of pins or conductors of the multi-conductor cable while receiving communications on another set of pins of the cable. However, due to mutual coupling between the different conductors of the cable, the signal transmitted by the transmitter portion of the network interface card (the "near end") may be sensed by the receiver portion of the network interface card along with a signal received from another computer in the network (at the "far end"). This causes interference and is often referred to as near end crosstalk because some portion of the near end transmitter is coupled into the near end receiver. We desire that only the far end transmitter be seen at the near end receiver. Such crosstalk can disrupt communications by making it difficult or impossible for the receiver to discriminate the received signal from noise (the noise is the near end transmitter or transmitters).

It has been discovered that the crosstalk can, in principle, be removed by cancellation. If the version of the near end transmitted signal that is actually coupled to the receiver could be determined, then its inverse could be generated and applied to the receiver's input as a correction signal. However, it is not possible to predict what portion, if any, of the near end transmitted signal will be coupled to the receiver at any given moment and therefore it is not possible to predict what the correction signal should be. However, the correction signal could be derived using feedback to evaluate the errors of successive attempts and improve the correction signal. For example, well-known gradient descent methods and the like could be employed. Specifically, using the least means square (LMS) algorithm disclosed by Bernard Widrow and Samuel D. Stearns, *Adaptive Signal Processing*, the correction signal could be derived by varying selected parameters of the transmitted signal from which the correction signal is derived so as to optimize the cancellation of the near end crosstalk. I have discovered that in many applications, such as Fast or Gigabit Ethernet, the correction signal most likely consists principally of a delayed and bandpass filtered and attenuated version of the transmitted signal. Due to the nature of the mutual coupling that causes near end crosstalk, the correction signal may have to include a number of components of the transmitted signal each with a different time delay and a different amplitude, but with a relatively fixed bandpass filter. The delays and amplitudes would change over time due to the random nature of the near end crosstalk.

Since these delays and amplitudes cannot be known beforehand, the LMS algorithm would process the full range of possible delays (i.e., each tap in a filter) and find an amplitude (weight) and for each delay so as to reduce the feedback error. In successive iterations, the LMS algorithm would generate successive lists of the weights for each time delay in the range of delays. However, it would not seem practical to implement such a process on an integrated circuit because during each iteration, the number of multiplications that are performed to derive the correction signal is equal to the number of delays. This is because each delayed version of the transmitted signal across the range of possible time delays must be multiplied by the corresponding weight computed by the LMS algorithm for the current iteration. Since a very large number of such multiplications would appear to be necessary, it would not seem the foregoing approach is practical for implementation at extremely high speeds on an integrated circuit. At extremely high speeds, such as those encountered in a giga-bit per second computer network, these multiplications would likely have to be carried out simultaneously, so that a very large number of dedicated multipliers would have to be provided on the integrated circuit, rendering this approach impractical.

A problem for all adaptive systems is the definition of the error which the adaptive algorithm would seek to minimize. Another problem for adaptive systems that control the type of NEXT/Echo cancellers described above is that the canceller being adapted often contains a smaller number of adaptable parameters than the conventional LMS algorithm produces. So a method of choosing a subset of parameters must be designed.

SUMMARY OF THE INVENTION

The invention is embodied in an adapter for use with a near end crosstalk (NEXT) canceller which reduces crosstalk from a locally transmitted signal in a locally received digital signal by superimposing on the received signal a correction signal comprising a sum of time-delayed weighted and bandpass filtered samples of the transmitted signal corresponding to a range of n time delays. The adapter includes a non-linear subtractor for comparing certain samples of the received digital signal with an expected mean value to produce an error and a memory for storing a set of n weights associated with the n time delays. The adapter further includes an algorithm processor for adjusting the n weights in a manner tending to reduce the error and ranking logic for determining the m best of the n weights. Output logic provides to the NEXT canceller the m best of the n weights and the corresponding time delays of the m greatest ones of the n weights, wherein m is less than n, whereby the correction signal constitutes the sum of the products of the m time delayed samples and the m weights.

DETAILED DESCRIPTION OF THE PREFERRED EMBODIMENTS

Figure 1:
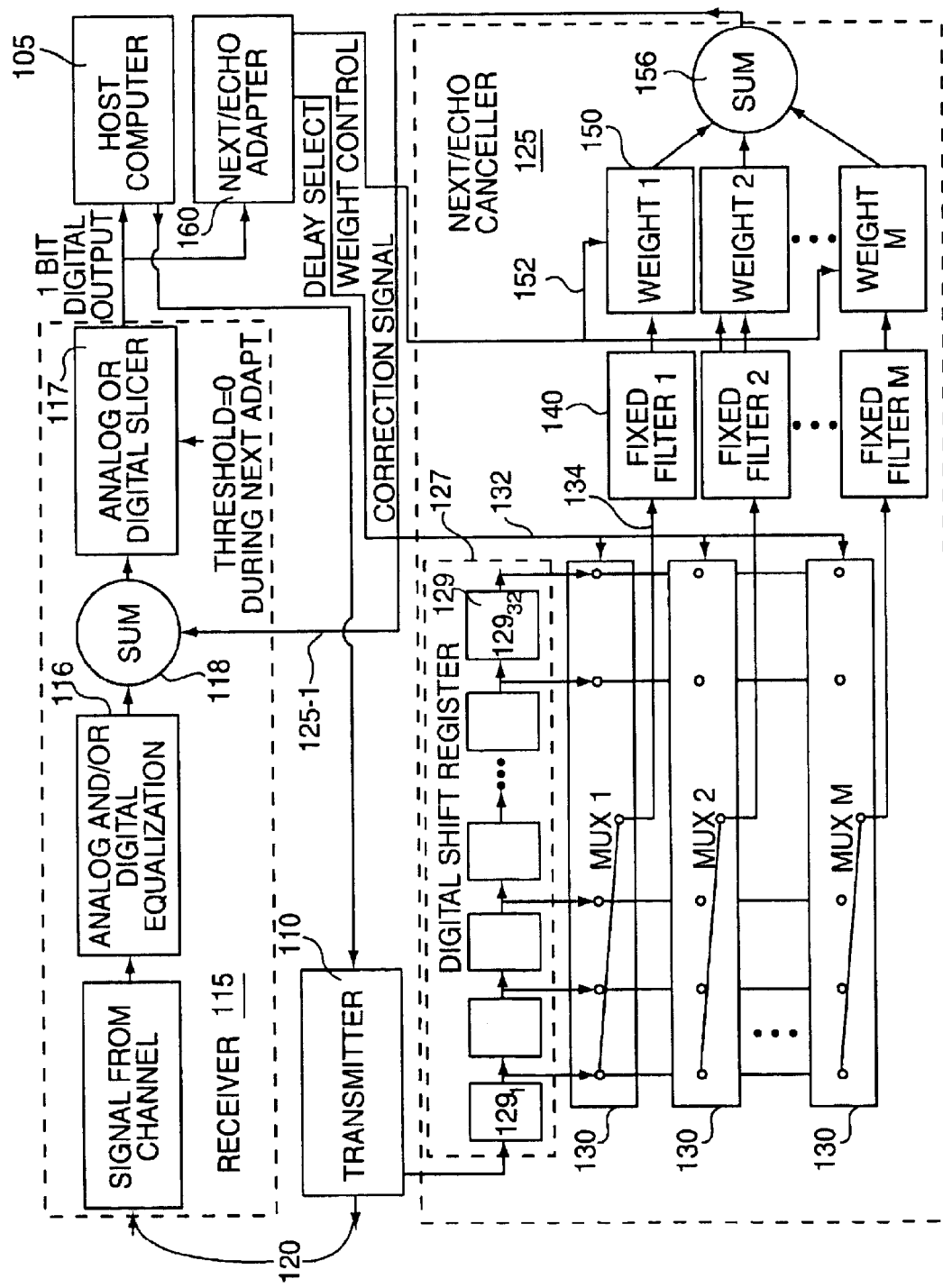
FIG. 1 is a schematic diagram of a preferred embodiment of the invention.

Referring to FIG. 1, a host computer 105 transmits signals to a network of which it is a member via a transmitter 110 and receives signals from the network via a receiver 115. The transmitter and receiver 110, 115 may be part of a network interface card (NIC) or modem card inside the host computer 105. The combination of the transmitter 110 and receiver 115 is referred to as a transceiver, and is connected to the network through a multi-conductor cable 120. The receiver 115 is of the conventional type that includes an analog or digital equalization circuit 116 and an analog or digital slicer 117. An adder 118 connected between the equalizer 116 and the slicer 117 superimposes on the received signal a correction signal whose origin will be described below. The equalization circuit 116 compensates for distortions of the received signal attributable to stray reactances in the multi-conductor cable 120. The slicer 117 transforms successive samples of the received signal into a succession of logic highs and logic lows by comparison of the samples with a threshold amplitude (e.g., zero volts) about which the received signal is centered.

Cancellation of near end crosstalk (NEXT) in the receiver 115 is performed by a NEXT canceller 125. The canceller 125 receives the transmitted signal from the transmitter 110 and produces a correction signal at its output 125-1. This correction signal is applied to one input of the adder 118 within the receiver 115. The correction signal, ideally, is the inverse of the near end crosstalk in the receiver 115 and therefore nullifies or at least reduces it, so that the output of the adder 118 has reduced or zero near end crosstalk.

Structure of the NEXT Canceller

The NEXT canceller 125 stores successive n-bit words (e.g., 3-bit words) of the near end digital transmit signal from the transmitter 110 in a digital shift register 127 having N cells 129. Each cell 129 has n bits and stores one word of the transmitted signal. N, the number of cells 129, is sufficiently large to account for the longest possible delay to a near end crosstalk event. For example, N may be 32 or larger. The NEXT canceller 125 has several (M) multiplexers 130, the number M of multiplexers 130 being far less than the number N of cells 129. For example, the number of multiplexer 130 may be M=5. Each multiplexer 130 can select as its input any one of the N cells 129 of the digital shift register 127. For this purpose, each multiplexer 130 has a select input 132 that determines which one of the N shift register cells 129 the particular multiplexer selects as its input. The contents of the selected cell are provided at an output 134 of the multiplexer 130. A set of M fixed filters 140 may be provided at the outputs of respective ones of the multiplexers 130. The filters 140 may be digital filters that provide the equivalence of a corrective response. However, in the preferred embodiment, the filters 140 were not present nor necessary. A set of M weight multipliers 150 multiplies the output of each multiplexer 130 by a particular weight. The weights of the various multipliers 150 may all differ from one another or may all be the same. Each weight multiplier has a weight control input 152 that determines the value of the weight by which the multiplier 150 multiplies the output of the corresponding multiplexer 130. The products computed by the multipliers 150 are summed together in an adder 156, whose output is the correction signal output 125-1 connected to the added 118 in the receiver 115.

The NEXT canceller 125 constructs the correction signal from M (e.g., 5) versions of the transmitted signal, each with an individually selected delay and an individually selected amplitude. The particular delay is determined by which one of the cells 129 the corresponding multiplexer 130 selects. The particular amplitude is determined by the weight value applied to the weight control input 152 of the corresponding weight multiplier 150. The particular delays and weights can be determined by a suitable adaptive algorithm.

A significant advantage of the NEXT canceller 125 of FIG. 1 is that there are only several multipliers 150 (e.g., M=5 such multipliers). Prior art NEXT cancellers using the LMS algorithm assume as many multipliers 150 as there are samples or cells 129. However, it is seen that a very large number of delayed samples held by the N cells is handled with only a very small number (M) of multipliers 150. This advantage is made possible by a realization of the invention that only a very small number of samples of the transmitted signal (corresponding to a small number of cells 129) contribute significantly to the correction signal. Thus, the amplitudes or weights associated with most of the N samples are zero or nearly zero, leaving only a few samples with significantly large weights. Therefore, as will be discussed below, the invention selects from the results of the LMS algorithm only M delayed samples having the M largest weights.

A NEXT adapter 160 outputs respective delay select signals to the delay select inputs 132 of the respective multiplexer 130 and outputs respective weight value signals to the weight control inputs of the respective weight multipliers 150. The NEXT adapter 160 receives the output of the slicer 117 as its input. The NEXT adapter 160 is a processor which implements a trial-and-error algorithm or the LMS algorithm to determine for each new sample of the output signal an optimum set of weights corresponding to the set of delayed samples held in the shift register 127. However, the NEXT adapter selects only the delayed samples having the M highest weights and assigns respective ones of the multiplexers to select the M cells 129 corresponding to those M samples. Contemporaneously, the adapter outputs the appropriate weight values to the M weight multipliers 150. This process is repeated preferably with each new sample of the transmitted signal.

Figure 2:
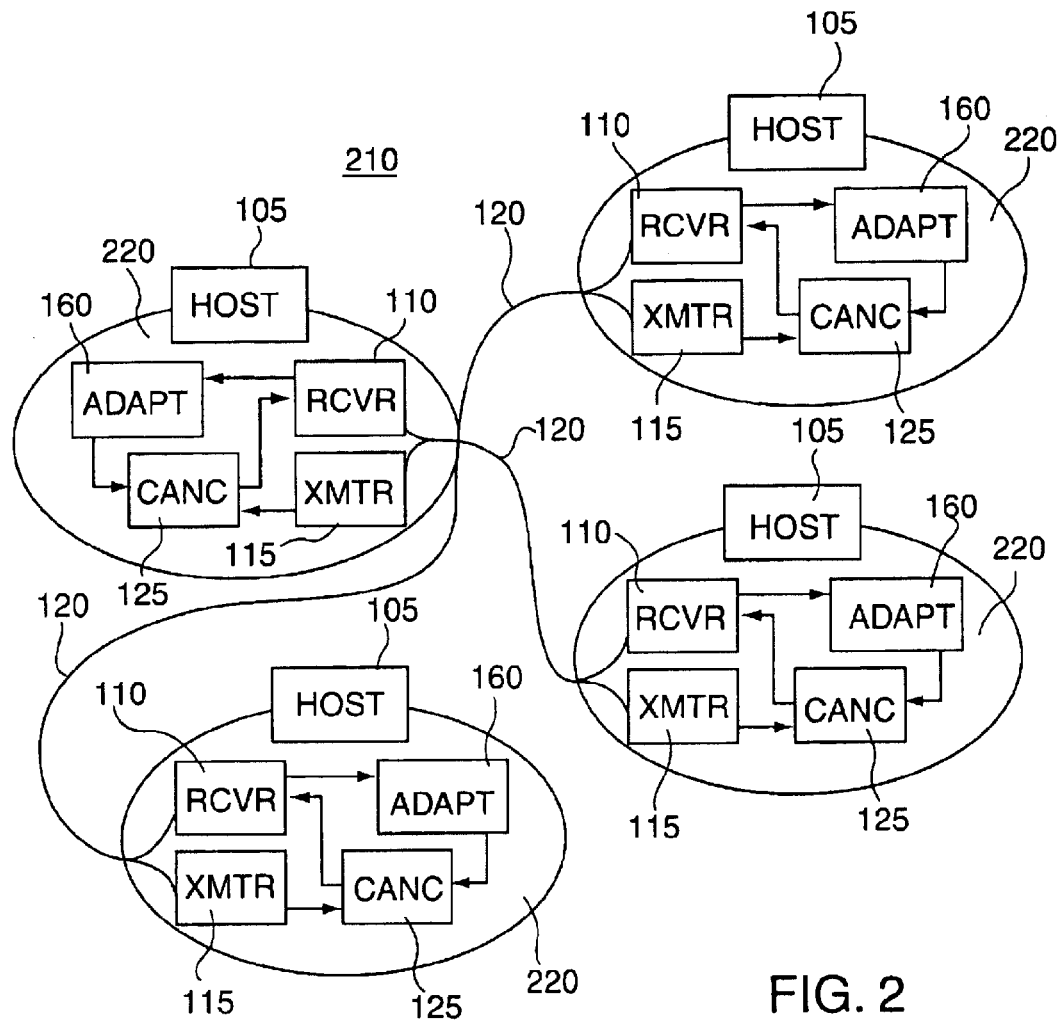
FIG. 2 illustrates a network embodying the invention.

FIG. 2 illustrates a network 210 including a number of nodes 220 connected by cables 120, each node 220 including a host computer 105, a transceiver 110, 115, a NEXT canceller 125 and a NEXT adapter 160.

Operation of the NEXT Adapter

The NEXT adapter 160 may be implemented as a programmed microprocessor or as dedicated logic, and therefore it is described herein in terms of its operation which will be generally the same regardless of the type of hardware in which it is implemented. However, the operational description of the NEXT adapter 160 will be given with reference to a physical embodiment having both dedicated logic elements and programmed processing elements.

Figure 3:
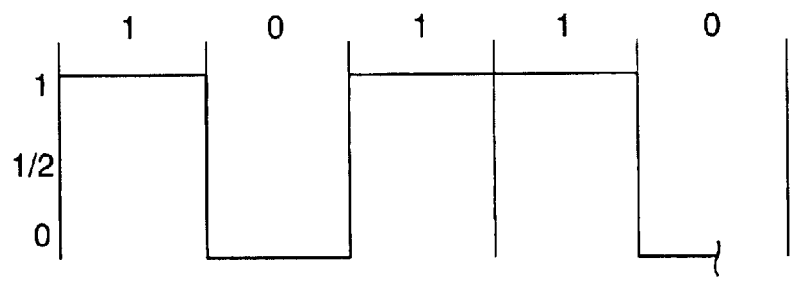
FIG. 3 illustrates a digital signal from which an error is computed by a NEXT adapter of the invention.

The adapter 160 performs an algorithm (based on the LMS algorithm) which varies the weights associated with each of the delay positions of the digital shift register 125 so as to minimize an error measured during a current iteration of the algorithm. However, a suitable measure of an error is not defined for near end crosstalk. This problem is solved in accordance with the preferred embodiment of the invention, by defining the error as the discrepancy between of the binary 0 and 1 bits output by the slicer 117 and one-half. (Alternatively, in the case of a multi-level slicer that outputs more than two levels, the error may be defined as the discrepancy between the multi-leveled output of the slicer—3 levels in the case of Fast Ethernet, and 5 levels in the case of Gigabit Ethernet—and the average of the possible slicer output values.) That this is a valid measure of the error may be understood by considering that in the absence of near end crosstalk, and assuming a random binary pattern in the received signal (illustrated in FIG. 3), the number of binary zeroes should be about the same as the number of binary ones in the received signal over a long period of time. Thus, the average of the sum of binary ones and zeroes should approach one-half over a long period of time (or, alternatively, the average of the possible values in the case of the multi-level slicer output). A departure of this average from one-half therefore represents an error. While this error may arise from near end crosstalk as well as other sources, the present invention minimizes the error by optimizing the transmitted signal fed back to the receiver. Thus, the present invention minimizes or eliminates the near end crosstalk component of the error.

Figure 4:
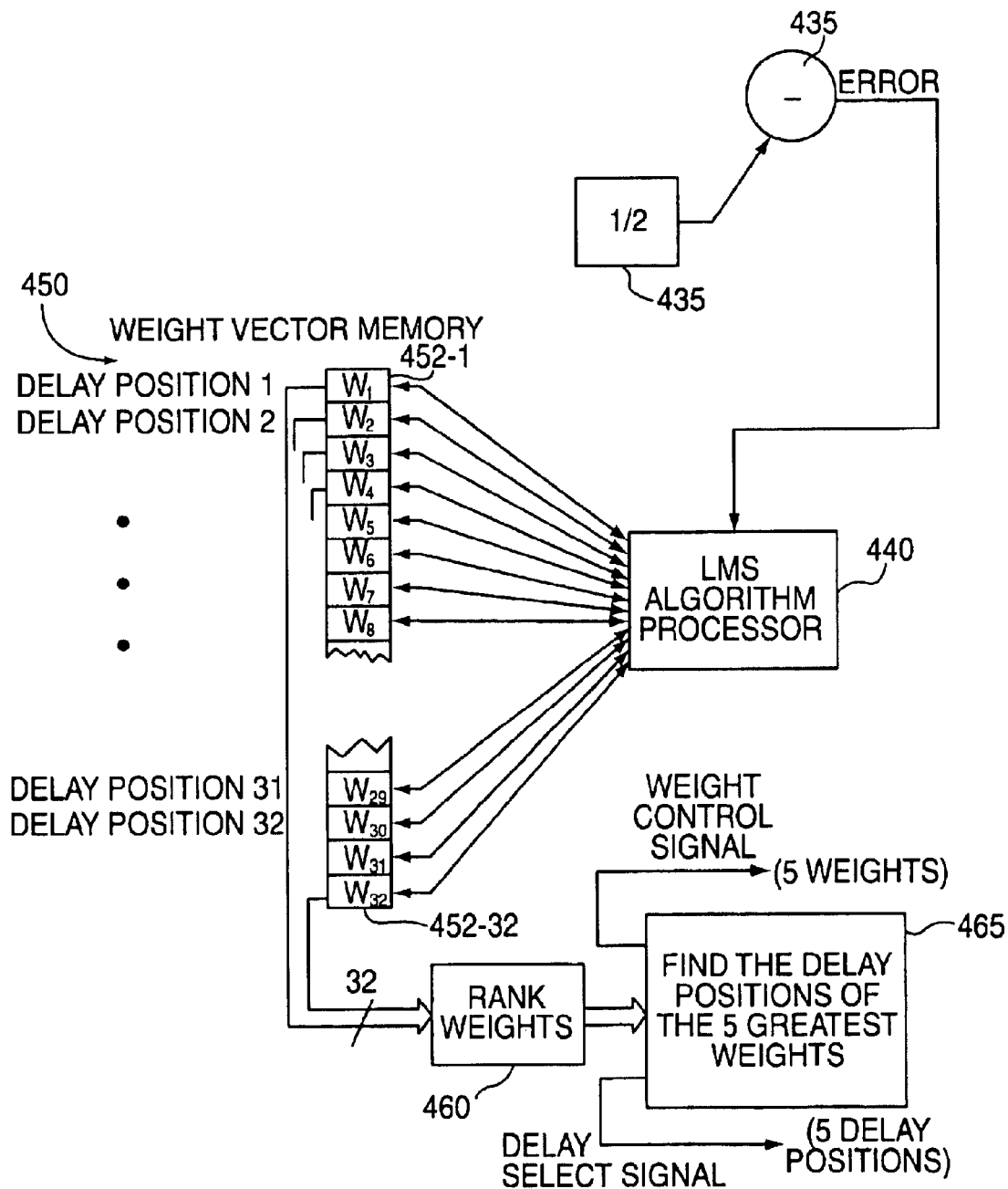
FIG. 4 illustrates a preferred embodiment of a NEXT adapter of the invention.

FIG. 4 illustrates one implementation of the NEXT adapter 160. A non-linear subtractor 435 compares certain outputs of the slicer with the value one-half (½), (or, again, the average of the possible slicer output values) the difference being the current error. The certain outputs that the non-linear subtractor 435 compares may be all the outputs, as in the preferred embodiment, or only those outputs whose pre-slicer values are near the average value of perfect, no NEXT/Echo samples.

A programmed microprocessor 440 receives the error from the subtractor 435 and performs the weight iteration part of the well-known least means square (LMS) algorithm to determine a new weight for each time delay or delay position corresponding to each cell 129 of the shift register 127 of FIG. 1. The current set of weights is stored in a weight vector memory 450 having as many memory locations 452 as there are cells in the shift register 127 of FIG. 1. Each memory location stores a weight value (e.g., a 3-bit weight value to be applied to the output of a corresponding one of the cells 129 of FIG. 1. For example, in a preferred embodiment, the shift register 127 has thirty-two cells 129, and therefore the weight vector memory 450 has thirty-two memory locations 452. The thirty-two memory locations 452 are arranged in the weight vector memory 450 in ascending order of the delay times associated with the corresponding cells. Thus, the weight $W_1$ stored in the first memory location 452-1 is associated with the first cell $129_1$ of the shift register 127 of FIG. 1. The weight $W_{32}$ stored in the last memory location 452-32 is associated with the last cell $129_{32}$ of the shift register 127 of FIG. 1. With each new binary bit output by the slicer 117, the subtractor 430 outputs a new error to the LMS processor 440. The LMS processor performs one iteration of the LMS algorithm with each new error. In each iteration, the processor 440 adjusts the weight vector consisting of the thirty-two weights in the weight vector memory 450. The LMS algorithm is such that the adjustments of the weight vector over many such iterations tend to reduce the error. The LMS processor 440 is readily programmed by a skilled worker in accordance with the steps of the LMS algorithm described in *Adaptive Signal Processing* by Widrow and Stearns. The LMS algorithm reads the current weights stored in the memory locations 452 and uses these values to perform the next iteration of the LMS algorithm. This results in the computation of new values for at least some of the weights. The LMS processor 440 writes the new weight values to corresponding ones of the memory locations 452, which expunges the old values previously stored therein. The LMS processor uses the newly stored weights in the weight vector memory to perform the next iteration of the LMS algorithm as soon as the next error is received from the subtractor 430.

A logic element 460 ranks the thirty-two weights in the memory 450 by magnitude. While this is the presently preferred manner of ranking, other types of rankings are possible. For example, they could be ranked in clusters. Thus, for example, the logic element 460 may choose the P largest weights (where P is less than M), and then choose (for example) the two nearest neighbors to each one of the P weights, so that the total number of chosen weights is M. In this case, P would be one third of M. Alternatively, if P is half of M, then only one nearest neighbor would be chosen for each of the P largest weights. Now, continuing with the preferred embodiment in which the logic element 460 ranks the weights by magnitude only, a logic element 465 determines the M greatest weights (e.g., M=5) and determines the delay positions of those M weights. The logic element 465 determines the M delay positions by simply noting the location within the weight vector memory 450 of each of the M largest weights. The logic element 465 directs each of the M multiplexers 130 to one of the M cells corresponding to one of the M delay positions of the M greatest weights. For this purpose, the logic element 465 transmits a delay select signal to each multiplexer 130 identifying one of the thirty-two cells 129 whose output the particular multiplexer 130 is to select. Simultaneously, the logic element 465 transmits a weight control signal defining the five greatest weights to respective ones of the weight multipliers 150 associated with corresponding ones of the multiplexers 130. The logic element may be a microprocessor programmed in straightforward fashion to carry out the foregoing steps which form and transmit the weight control signal and the associated delay select signal.

In another embodiment, the NEXT adapter of FIG. 4 may be implemented as a single microprocessor programmed to perform all of the functions described with reference to FIG. 4.

While the invention has been described in detail by specific reference to preferred embodiments, it is understood that variations and modifications thereof may be made without departing from the true spirit and scope of the invention.

What is claimed is:

1. A NEXT adapter for use with a near end crosstalk (NEXT) canceller which reduces crosstalk from a locally transmitted signal in a locally received digital signal by superimposing on the received signal a correction signal comprising a sum of time-delayed weighted samples of the transmitted signal corresponding to a range of n time delays, the NEXT adapter comprising:

a subtractor for comparing a value of the received digital signal with an expected mean value to produce an error;

a memory for storing a set of n weights associated with said n time delays;

an algorithm processor for adjusting said n weights in a manner tending to reduce said error;

ranking logic for determining m greatest ones of said n weights; and output logic for providing to said NEXT canceller the m greatest ones of said n weights and the corresponding time delays of said m greatest ones of said n weights, wherein m is less than n, whereby said correction signal constitutes a sum of products of m time delayed samples and the m greatest weights.

2. The apparatus of claim 1 wherein n is on the order of 32 and m is on the order of 5.

3. The apparatus of claim 1 wherein n is on the order of six times greater than m.

4. The apparatus of claim 1 wherein said algorithm processor comprises a microprocessor programmed to perform a least means square algorithm.

5. The apparatus of claim 1 wherein said memory comprises n memory locations arranged in ascending order of time delays of the respective time delayed samples of said transmitted signal, whereby the memory location of each of the m greatest weights defines the time delayed sample of the transmitted signal corresponding thereto.

6. The apparatus of claim 1 wherein said received signal is a binary digital signal of a fixed bit rate that has a first amplitude corresponding to one of two binary states and a second amplitude corresponding to the other binary state, and wherein said mean value is an amplitude generally half-way between said first and second amplitudes.

7. The apparatus of claim 1 wherein the received signal is a multi-level digital signal of a fixed bit rate, and wherein said expected mean value is an amplitude that is an average of possible values of the multi-level digital signal.

8. The apparatus of claim 1 wherein said subtractor provides a succession of errors in at least approximate synchronism with a bit rate of said received signal.

9. The apparatus of claim 1 wherein said subtractor is a non-linear subtractor which chooses only certain values to subtract from the expected mean, the choosing based on the nearness of the pre-slicer values to the expected mean.

10. The apparatus of claim 8 wherein said algorithm processor updates said n weights in at least approximate synchronism with the bit rate of said received signal.

11. A near end crosstalk (NEXT) cancellation system for generating from a locally transmitted signal a correction signal to be superimposed on a locally received signal, said near end crosstalk cancellation system comprising:

(I) a near end crosstalk (NEXT) canceller, comprising:
  (a) a digital shift register for storing n successively delayed samples of the transmitted signal, where n is an integer;
  (b) a plurality of m multiplexers, where m is less than n, each one of said multiplexers capable of selecting upon receipt of a delay select signal one of said n samples in said shift register specified by the delay select signal, and providing the selected sample at an output of the one multiplexer;
  (c) a plurality of m weight multipliers connected to the outputs of respective ones of the m multiplexers to multiply the samples selected by the m multiplexers by respective weights specified by a weight control signal; and
  (d) an adder for summing the products computed by the m weight multipliers, the sum computed by said adder corresponding to a correction signal; and (II) a near end crosstalk (NEXT) adapter, comprising:
  (a) a subtractor for comparing a long term average of the received signal with an expected mean value to produce an error;
  (b) a memory for storing a set of n weights associated with n time delays;
  (c) an algorithm processor for adjusting said n weights in a manner tending to reduce said error;
  (d) ranking logic for determining m greatest ones of said n weights; and
  (e) output logic for providing to said weight multipliers a weight control signal constituting the m greatest ones of said n weights and a delay select signal to said m multiplexers identifying the corresponding time delays of said m greatest ones of said n weights, whereby said correction signal constitutes a sum of products of m time delayed samples and the m greatest weights.

12. The apparatus of claim 11 wherein n is on the order of 32 and m is on the order of 5.

13. The apparatus of claim 11 wherein n is on the order of 6 times m.

14. The apparatus of claim 11 further comprising an adder having a pair of inputs receiving, respectively, said received signal and said correction signal.

15. The apparatus of claim 11 further comprising a set of m filters connected to the outputs of respective ones of said multiplexers.

16. A method of controlling a near end crosstalk (NEXT) canceller which reduces crosstalk from a locally transmitted signal in a locally received digital signal by superimposing on the received signal a correction signal comprising a sum of time-delayed weighted samples of the transmitted signal corresponding to a range of n time delays, said method comprising:

comparing a long term average of the received digital signal with an expected mean value to produce an error;
  storing a set of n weights associated with said n time delays;
  adjusting said n weights in a manner tending to reduce said error;
  determining m greatest ones of said n weights; and
  providing to said NEXT canceller the m greatest ones of said n weights and corresponding time delays of said m greatest ones of said n weights, wherein m is less than n, whereby said correction signal constitutes a sum of products of m time delayed samples and the m greatest weights.

17. The method of claim 16 wherein n is on the order of 32 and m is on the order of 5.

18. The method of claim 16 wherein n is on the order of six times greater than m.

19. The method of claim 16 wherein the step of adjusting the weights comprises the step of performing a least means square algorithm.

20. The method of claim 16 wherein the step of storing said n weights comprises arranging said n weights in ascending order of the time delays of the respective time delayed samples of said transmitted signal, whereby the stored location of each of said m greatest weights defines the time delayed sample of the transmitted signal corresponding thereto.

21. The method of claim 16 wherein said received signal is a binary digital signal of a fixed bit rate that has a first amplitude corresponding to one of two binary states and a second amplitude corresponding to the other binary state, and wherein said mean value is an amplitude generally half-way between said first and second amplitudes.

22. The method of claim 21 wherein the step of providing said error is performed in at least approximate synchronism with a bit rate of said received signal.

23. The method of claim 22 wherein the step of adjusting said weights comprises the step of updating said n weights in at least approximate synchronism with the bit rate of said received signal.

24. The method of claim 16 wherein the step of determining the m greatest ones of said weights comprises choosing p weights having greatest magnitude and choosing nearest neighbors of said p weights so that a total of the p weights and said nearest neighbors is m, wherein m and p are integers and m is greater than p.

* * * * *